Aug. 20, 1963 R. H. MacNEAL 3,101,121
ROTARY WING DEVICE AND METHOD FOR OPERATING SAME
Filed Aug. 19, 1960 2 Sheets-Sheet 1
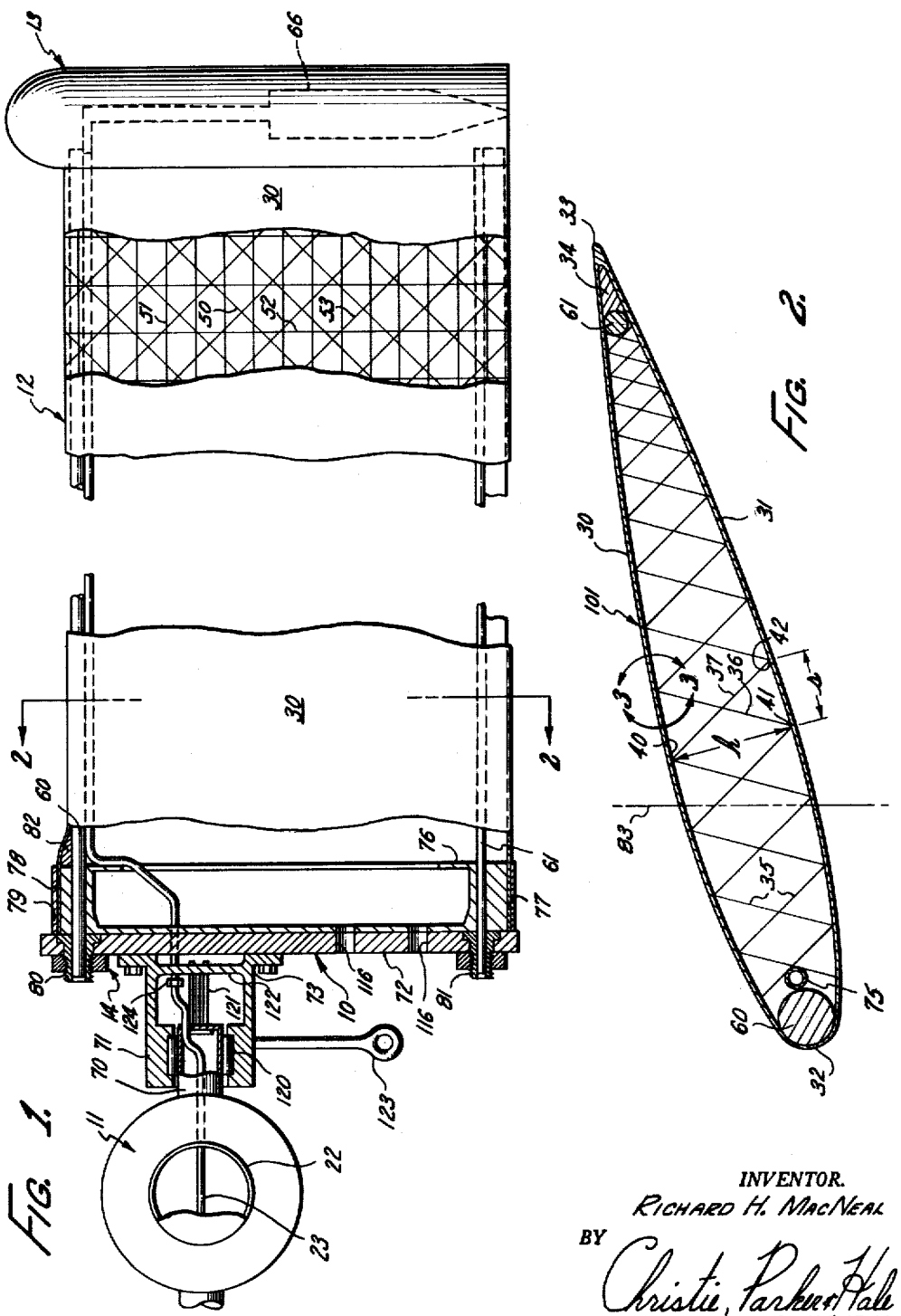
INVENTOR.
RICHARD H. MacNEAL
BY Christie, Parker&Hale
ATTORNEYS

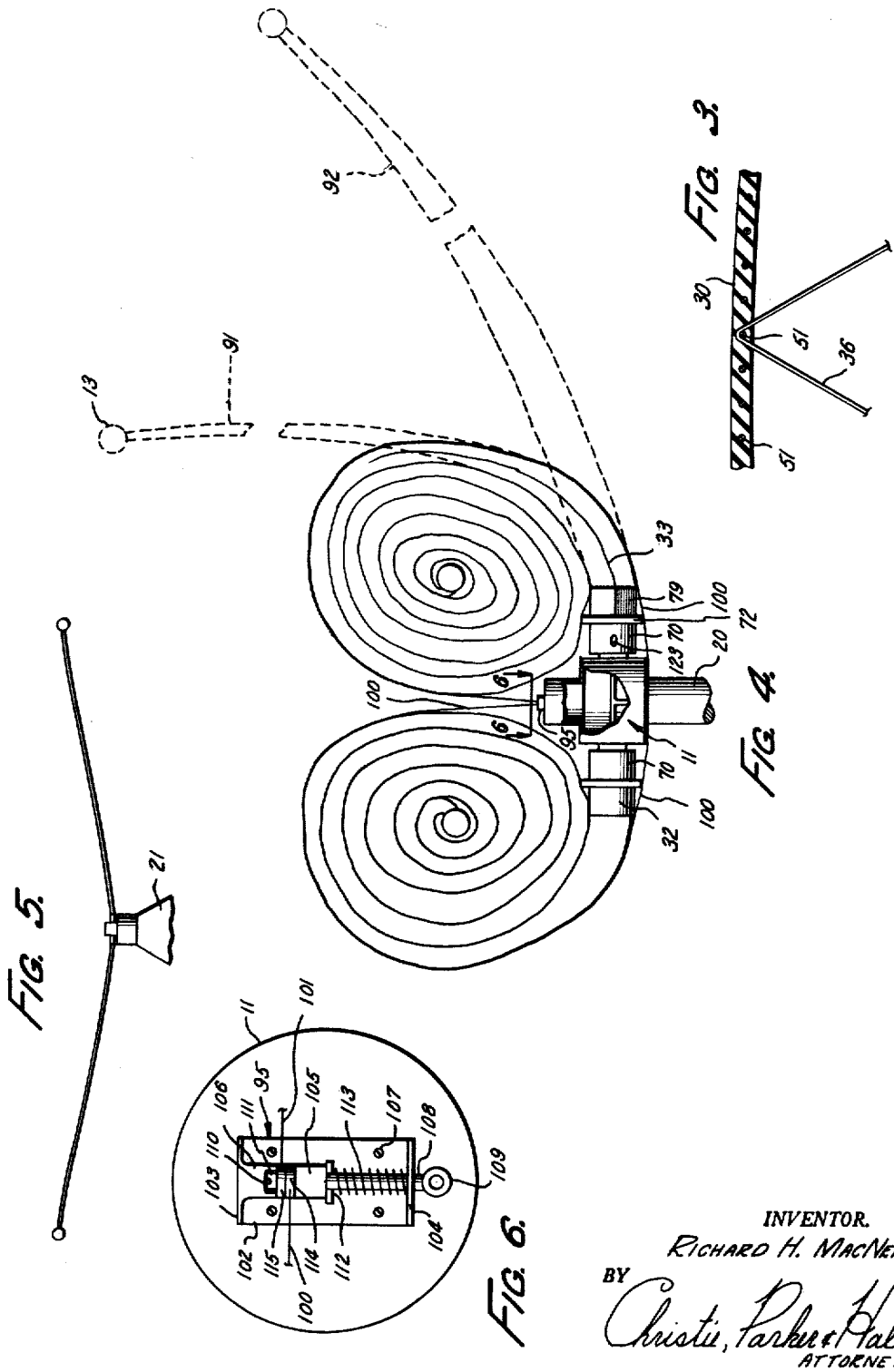

United States Patent Office 3,101,121
Patented Aug. 20, 1963

3,101,121
ROTARY WING DEVICE AND METHOD FOR
OPERATING SAME
Richard H. MacNeal, La Canada, Calif., assignor to Computer Engineering Associates, Inc., Pasadena, Calif., a corporation of California
Filed Aug. 19, 1960, Ser. No. 50,632
5 Claims. (Cl. 170—160.12)

This invention relates to a rotary wing device of the type having flexible collapsible wings and to method for operating same, particularly method for erecting and maintaining the wings in operating position.

In rotary wing lifting devices, the wings are conventionally quite long, and this length, together with their general unwieldiness, presents the problem of compact storage of the wings when the lifting device is not in use. An attempt to solve this problem has been the use of collapsible wings which may be collapsed and stored compactly adjacent the rotary hub of the lifting device when it is not in use. However, this type wing has raised the problems of efficiently and effectively erecting the wing into operating position and of obtaining sufficient strength and rigidity of the erected wing to provide necessary structural integrity thereof and the desired aerodynamic lift thereof when it is rotated about an axis transverse to its elongate extent.

The above problems are solved by the invention, which provides flexible collapsible wings which can be rolled up or folded for compact storage adjacent the hub of the device and which are erected and maintained relatively rigidly in operating position when the device is in use. The erection is achieved as a result of centrifugal force produced by rotation of the wings acting upon gas within pneumatic cavities in the wings and upon the structure of the wings. This centrifugal force cumulatively increases as the angular velocity of the wings increases, thereby producing the additional aerodynamic rigidity of the wings necessitated by their greater angular velocity and increasing the aerodynamic forces on the wings, which further increases their angular velocity. Consequently, the rotation of the wings, which creates the need for aerodynamic rigidity of such wings, itself creates, through centrifugal force, the needed aerodynamic rigidity as well as greater angular velocity thereof.

The apparatus of the invention includes a plurality of elongated wings extending radially from and spaced angularly about a common axis of rotation oriented at substantially right angles to the elongate extent of the wings. Each wing includes a flexible gas impermeable member defining the exterior surfaces of the wing and forming a penumatic cavity within the wing so that the wings may be collapsed and deformed flexibly into a compact bundle adjacent their axis of rotation for storage when the device is not in use. Means is provided for supplying gas to the pneumatic cavities in the wings. The gas which is supplied to the pneumatic cavities of the wings may be derived from the atmosphere or it may be supplied from a pressurized source.

The method of the invention relates to the erecting of the wings from stored position into operating position and maintaining them in rigid operating condition. The method includes the steps of unfurling the wings from their stored position, rotating the unfurled wings about their axis of rotation, and admitting gas from without the wings into an internal pneumatic cavity in each wing. As a result of this method, the rotation of the wings produces centrifugal force acting outwardly from the axis of rotation upon the mass of the wings and upon the gas within the pneumatic cavity in each wing. This centrifugal force tends to erect the wings in their plane of rotation, which increases the aerodynamic forces on the wings. These forces tend to increase the angular velocity, which in turn further increases the centrifugal force and therefore the extent and rigidity of the erection. This interdependent relationship of cumulatively increasing extent and rigidity of erection and angular velocity continues so that eventually the wings are rigidly erected in operating position. As the angular velocity of the wings increases, the extent of their erection and the rigidity of their erection correspondingly increases.

The invention and its advantages will be fully understood by reference to the following detailed description thereof taken in conjunction with the accompanying drawings, in which:

FIG. 1 is a fragmentary plan view, partially in section, of the rotary wing device of the invention;

FIG. 2 is an enlarged sectional view taken along the line 2—2 in FIG. 1;

FIG. 3 is an enlarged sectional view taken along the line 2—2 of FIG. 1;

FIG. 4 is an elevational view of the rotary wing device of the inventoin showing the storage of the wings in collapsed condition and stages in the erection of the wings.

FIG. 5 is an elevational view similar to FIG. 4 showing the wings fully erected in operating position and condition; and FIG. 6 is an enlarged plan view looking along the line 6—6 in FIG. 4.

Referring now to FIG. 1, the rotary wing device, or rotor, of the invention is designated generally with the reference numeral 10. The rotor 10 includes a hub 11, a plurality of identical wings such as the wing 12, a mass 13 attached to the tip of each wing, and means 14 for attaching each wing to the hub.

The hub 11 is conventional and is shown schematically in the drawings. The hub is rotatably mounted on a shaft 20 (FIG. 4) by means of conventional bearing structure found in helicopter rotors for rotation about its central axis. The shaft 20 is in turn fixed to an object to be transported with the rotary wing device, such as a rocket nose cone, indicated at 21 in FIG. 5. Instead of a rocket nose cone, a capsule for re-entry from space, spent rocket missile boosters, cargo or, indeed, a harness for attachment of the device to an individual may be attached to the shaft 20. The hub 11 has an internal chamber 22 within which compressed gas lines 23 may be located to supply gas to the wings for purposes explained below.

A plurality of elongated wings 12 extend radially from the hub at substantially right angles to its axis of rotation in spaced relation to each other about such axis. Preferably, as shown in the drawings, there are two diametrically opposed wings, but it is to be understood that any other number of wings may be utilized. All of the wings 12 are identical in construction so that a description of one will suffice for all. As best shown in FIG. 2, the exterior surfaces of the wing 12 are defined by a flexible gas-impermeable member 101, preferably made of rubber-like material, having first and second juxtaposed, spaced sheets 30 and 31 which form an internal pneumatic cavity within the wing. The sheets 30 and 31 may be portions of one continuous member, as described above, or they may be separate sheets the elongate edges of which are gas-impermeably joined together at the leading edge 32 and at the trailing edge 33 of the wing. A flexible fairing 34 made of rubber-like material may be disposed between the sheets 30 and 31 at the trailing edge, if desired. Also, if desired, the thickness of the sheets 30, 31 may decrease as they extend away from the hub 11 so that they have greater thickness and strength near the hub where the stresses are greater. The sheets 30, 31 may be fabricated from thin layers of flexible material cemented together.

A plurality of coplanar flexible chord braces, indicated generally at 35 in FIG. 2, are attached to and extend between the sheets 30, 31. The chord braces lie in a chord plane, i.e., a plane extending between the leading and trailing edges of the wing at substantially right angles to the planar extent of the wing and to the longitudinal axis thereof. Such a plurality of coplanar chord braces 35 is located at a plurality of locations spaced along the longitudinal axis of the wing, spacing of on the order of one inch between each set of coplanar chord braces being satisfactory. The chord braces 35 are preferably of metal, for example, steel wire of .005 inch diameter. In each set of plural coplanar chord braces, pairs of the braces are oppositely inclined and cross each other to, in effect, form a series of X-trusses extending between the sheets 30 and 31. The lengths of the chord braces between the sheets are varied so that linear erection of the braces conforms the exterior surfaces of the sheets 30, 31 to an airfoil shape, as shown in FIG. 2. The airfoil is preferably a relatively thin section with a maximum depth not in excess of approximately 15 percent of its total chord. For example, the N.A.C.A. 0012 airfoil may be employed. Each pair of crossed, oppositely inclined chord braces 35, such as the particular braces 36, 37, FIG. 2, are designed so that the spacing $s$ between their opposed ends 41, 42 attached to the same sheet is less than the spacing $h$ between their aligned ends 40 and 41 attached to opposite sheets. With this arrangement, stress analysis shows that an internal gas pressure in the gas impermeable cavity formed between the sheets 30, 31 will result in each pair of crossed chord braces tensioning the portion of the sheet extending between the ends thereof anchored thereto, such as the portion of the sheet 31 extending between the ends 41 and 42 of the braces 36, 37. Thus, each set of plural chord braces 35 act, in effect, as ribs to maintain the exterior surfaces of the sheets 30, 31 in an airfoil configuration and in a tensioned condition when there is an internal gas pressure in the pneumatic cavity between the sheets.

As best shown in FIGS. 1 and 3, a plurality of brace members, such as indicated generally at 50, 51, 52, and 53, are embedded in and bonded to each sheet coplanarly therewith. Each sheet 30, 31 contains identical brace members so that a description of one sheet will suffice for both. The brace members are flexible and preferably metallic, for example, steel wire of .005 inch diameter. The brace members include a plurality of spaced, parallel diagonal braces 50 and 53 which extend between the elongate edges, or leading and trailing edges 32 and 33, respectively, of the wing and are inclined relative to the longitudinal axis of the wing in opposite directions at right angles to each other. The diagonal braces provide torsional and shearing stiffness for the wing when it is rotated about the axis of rotation of the hub 11. If desired, the brace members may include a plurality of spaced, parallel longitudinal braces 51 extending the length of the wing substantially parallel to its longitudinal axis. Such longitudinal braces carry tension loads exerted upon the wing as a result of centrifugal force when it is rotated about the axis of rotation of the hub 11. When the longitudinal braces 51 are provided, it is preferable that the chord braces 35 be anchored in the sheets 30, 31 by looping the chord brace over the longitudinal brace, as shown in FIG. 3. If desired, the brace members may also include a plurality of spaced, parallel transverse braces 52 extending between the leading and trailing edges of the wing at substantially right angles to the longitudinal axis thereof. When the transverse braces 52 are provided, they are designed to be flexible in a direction perpendicular to the planar extent of the sheets 30, 31 and, preferably, to be of substantial axial stiffness, so that although they permit the airfoil chord section of the wing to collapse, they are capable of carrying axial compressive loads. The transverse braces, in addition to carrying compressive loads, help to maintain a smooth aerodynamic exterior surface of the sheets 30, 31. If transverse braces 52 are provided, it is preferred that they be spaced relatively close together, for example, on the order of one inch spacing.

Disposed between the sheets 30, 31 adjacent the leading edge 32 of the wing is a flexible leading edge tension member 60 which extends the full length of the wing. Preferably the tension member 60 is a stranded metal cable, so that, although its cross-sectional area and tensile strength are large, it is nevertheless flexible. The leading edge tension member 60 is attached to the sheets 30, 31 adjacent the leading edge in conventional manner, such as bonding of the sheets to the cable. If desired, a trailing edge tension member 61 may be located adjacent the trailing edge fairing 34. The trailing edge tension member 61 is flexible and of the same construction as the leading edge tension member 60, but it is of less cross-sectional area. The function of the leading and trailing edge tension members is to carry most of the longitudinal tension loads exerted upon the wing when it is rotated about the axis of rotation of the hub 11 and to provide stiffness to resist bending on the wing in its plane of rotation. Also, the leading edge tension member 60 serves to maintain the aerodynamic contour of the leading edge of the wing.

It is preferred that the center of mass of the wing in the chord plane lie near the quarter-chord point from its leading edge throughout the length of the wing. The leading and trailing edge tension members 60, 61 help to accomplish this through the considerably larger cross-sectional area, and thus mass, of the leading edge tension member relative to the trailing edge tension member, as shown in FIG. 2. Preferably, the mass of the leading edge tension member is about one-half the total mass of the wing in order to produce the desired location of the center of gravity. If the mass of the tension members and of the other structure of the wing is not sufficient to achieve the quarter-chord point center of gravity of the wing, balance weights may be attached to the leading edge tension member internally of the wing in order to compensate.

A wing tip mass 13 is provided to aid in the operation of the device as explained below, to help maintain an aerodynamic profile of the wing near its tip, and to help shift the center of gravity of the wing forward to the desired quarter-chord point. In addition, if desired, the tip mass 13 may function as a housing for an optional jet propulsion unit shown schematically at 66 to exert torque on the wing about the axis of rotation of the hub 11. The sheets 30 and 31, together with the brace members embedded therein, and the leading and trailing edge tension members 60, 61 are all secured to the tip mass 13 with conventional means readily apparent to one skilled in the art. The tip mass 13 may be omitted without impairing the structural strength of the wing, but such mass is preferred for operational reasons.

At the root of the wing 12, means 14 is provided for attaching the sects 30, 31, together with the brace members embedded therein, and the leading and trailing edge tension members 60, 61 to the hub 11 in such manner that the angle of incidence of the wing, that is, the angle between the plane of the rotation of the wing and a plane extending between the leading and trailing edges of the wing, may be varied during rotation of the wings. The means 14 is the same for all wings so that a description of it for the wing 12 will suffice for all. The means 14 includes a conventional schematically illustrated pitch bearing comprised of a hollow yoke 70 which has one end rigidly attached to the hub 11 and extends radially from the hub into a surrounding housing 71 rigidly attached to the wing at 73. The pitch bearing includes roller bearings 120 to effect a rotatable connection between the yoke 70 and the housing 71 which permits the housing 71 to rotate about the yoke 70 and transmits radial loads from the housing 71 to the yoke 70. A plurality of thin steel straps, indicated generally at 121, extend between the end of the yoke 70, to which they are fixed, and a web 122 in the housing 71 to which they are fixed. The straps 121 have very little torsional strength and thereby permit the housing 71 to rotate about the yoke 70 but are still adapted to transmit the large centrifugal forces exerted upon them to the yoke 70 and hence to the hub. A pitch control arm 123 is fixed to the housing 71 and is connected to conventional helicopter rotor mechanism for moving it to rotate the housing 71 about the yoke 70 and thus vary the angle of incidence of the wing and for holding it in a desired position to maintain a preselected angle of incidence of the wing. The housing 71 is rigidly connected at its end 73 to a grip plate 72. The compressed gas line 23 passes through the hollow yoke 70, through the hollow interior of the housing 71, is fitted with a rotatable joint coupling 124, and extends through the grip plate 72 into the pneumatic cavity of the wing 12. Attached to the grip plate 72 or made integrally therewith is a hollow root rib 76 made of rigid material, such as metal, which has an exterior surface conforming to the airfoil shape defined by the sheets 30, 31. The sheets 30, 31 extend over the root rib 76 at 77 and 78 and are securely fastened thereto by means of a band 79, preferably of metal, which overlies the portion of the sheets extending over the root rib 76 and serves as a clamp to fasten the sheets to the root rib. The band 79 conforms to the airfoil shape of the root rib, and thus provides at the root of the wing 12 a fixed airfoil portion thereof which is not collapsible. The tension members 60 and 61 extend through the root rib and the grip plate 72 and are anchored to the grip plate by means of conventional cable clamps and nuts 80 and 81 respectively. A suitable filler fairing 82 is provided at the leading edge of the wing where it passes over the root rib 76 to provide a smooth aerodynamic transition of the airfoil shape of the wing.

A compressed gas container (not shown) is carried by the device and through supply tube 23 supplies gas to the wing 12. Appropriate conventional valving may be employed in order to control and regulate the supply of gas. The valve may be turned on by actuation of the latch 95, if desired. The providing of the compressed gas container and the supply tube 23 is an optional feature of the invention. If desired, the gas supply tube 23 may terminate just within the hollow portion of the root rib 76 so that gas is supplied to the internal pneumatic cavity in the wing formed between the sheets 30, 31. This is advantageous in that such a supply of gas may be used to inflate the wings and thereby aid in unfurling them and erecteing them into operable position. Alternatively, or in addition thereto, through appropriate tubing and valving, the supply tube 23 may extend, as shown, adjacent the leading edge tension member 60 the full length of the wing 12 to supply the tip propulsion unit 66. The tip propulsion unit 66 is optional and may be advantageous where directional control or ascents with the device are desired. The gas supply tube 23 is identical for each wing. If the gas supply tube 23 is not adapted to supply gas to the internal pneumatic cavity in the wing, suitable air vent holes, such as at 116, are provided in the grip plate 72 so that air may pass from without the wing through the vent holes into the internal pneumatic cavity in the wing.

When the device is not in use, the wings are collapsed and rolled up or otherwise folded adjacent the hub 11 for compact storage, as shown in FIG. 4. Releasable holding means is provided to retain the rolled or folded wings in stored position adjacent the hub. The releasable holding means is conventional and is schematically illustrated in FIGS. 4 and 6. As shown in FIG. 4, a flexible retention cable 100 surrounds the rolled wings and has each end attached to a latch 95 mounted on top of the hub 11. The latch 95, as shown in plan view in FIG. 6, may comprise a substantially planar base 102 having upstanding flanges 103, 104 at each end, a bearing block 105 and a latch block 106. The flanges 103, 104 and the blocks 105, 106 extend upwardly from the base 102 and are rigidly attached thereto. The base 102 is fastened to the top of the hub with conventional means, such as rivets 107. A latch rod 108 has a suitable eye 109 at one end to receive a ripcord or the like and extends through and is slidably carried in the flange 104 and the bearing block 105. The latch block 106 is recessed at 110 to receive the end 111 of the latch rod. Adjacent the bearing block 105 and intermediate such block and the flange 104 is an outwardly extending retention pin 112 attached to the latch rod. The retention pin bears against a compression spring 113 disposed between it and the flange 104. Each end of the retention cord 100 is secured to a ring 114, 115. The rings 114, 115 are slidably received on the latch rod 108. The compression spring 113 maintains the end 111 of the latch rod in registry with the recess 110 and thus maintains the latch in closed position. When the latch rod 108 is pulled outwardly, the latch is opened and its end 111 disengages the rings 114, 115, thus permitting the retention cable 100 to fall away and the wings to unfurl.

If desired, the latch rod may be actuated by remote control with conventional radio-controlled apparatus. Also, the latch rod may be actuated by conventional apparatus responsive to predetermined atmospheric pressure.

The operation of the device will now be described. As stated above, when the device is not in use, the wings are collapsed and rolled up or otherwise folded adjacent the hub 11 for compact storage, as shown in FIG. 4. Their flexible construction permits this. When the device is to be used, the latch 95 is actuated to open position to release the retention cable 100 and thereby permit the wings to unfurl and become erected into operating position. Erection of the wings of the device involves the method of the invention.

The method of the invention involves the following steps: First, releasing the wings from their stored position and unfurling them. Preferably this step is performed while the device is moving or falling downwardly through the atmosphere in a direction parallel to the axis of rotation of the hub 11. Alternatively, the wings may unfurled by hand. When the wings are released while the device is falling, the motion of the device will cause the wings to unfurl and to stream out in approximately the position 91 shown with dashed lines in FIG. 4. If the velocity of the device is high, as would be the case with a re-entry vehicle, the unfurled, streamed out wings will be subjected to high buffeting and shock loads. Herein lies one of the advantages of the invention, since the minimal drag, flexibility, and high structural strength of the wings adapts them to withstand such loads. This is in distinct contrast to conventional drag parachutes and rigid rotary bladed devices, which tend to have insufficient structural strength to withstand initial buffeting and impact loads when they are opened at high velocities. Second, after the wings have been released and unfurled, rotating the wings about the axis of rotation of the wings. Preferably this rotation is produced by the step of giving a portion of each wing a large negative angle of incidence, as shown in FIG. 2 for a relatively small negative angle of incidence about the axis of rotation 83 of the wings, which in cooperation with the above described step of unfurling the wings while the device is falling, produces the rotation. The wings are given their negative angle of incidence through rotation of the wings relative to the hub, as permitted by the pitch bearing, and the root rib 76 and band 79 provide a rigid, non-collapsible airfoil portion of each wing to effect the initial rotation of the wings. To effect the rotation, the device must, of course, be falling or moving in a direction substantially parallel to the axis of rotation of the wings. Alternatively, the rotation may be effected by means of small gas jet nozzles mounted in the housing 71 in the plane of rotation of the wings and supplied from the compressed gas container. Third, admitting gas into the internal pneumatic cavity in each wing. As explained above, this may be accomplished either by means of air vents extending through the grip plate 72 into the pneumatic cavity or by means of gas supplied to such cavity through the gas supply tube 23.

With the wings unfurled as shown at 91 in FIG. 4, the initial rotation given to the wings produces centrifugal force acting thereupon which causes the wings to move outwardly to the position 92 shown with dashed lines in FIG. 4. The tip mass 13 is preferred because it tends to increase this centrifugal force and thus aids in erecting the wings. The centrifugal force also acts upon the gas admitted to the internal pneumatic cavity in each wing and creates an internal gas pressure within such cavity. This pressure may be expressed by the well-known formula:

$$p = p' + \frac{dw^2 r^2}{2}$$

where $p$ is the gas pressure within the pneumatic cavity, $p'$ is the gas supply pressure, if any, from a source of compressed gas, $d$ is the density of the gas, $w$ is the rotational speed or angular velocity of the wing, and $r$ is the distance from the axis of rotation of the wings to the point where the pressure $p$ exists. From the above it can be seen, as explained in the introductory portion of the application, that centrifugal force acting on the structure of the wings and upon the gas within the wings causes the tips of the wings to move outward and stiffens the wings so that the portion of each wing nearest the hub will take on the shape of an efficient airfoil. The angle of incidence of this portion of each wing is constrained by torsional stiffness to be nearly equal to the angle of incidence of the root rib so that the aerodynamic forces tending to increase the angular velocity of the rotor will be increased. Increased angular velocity will, in turn, increase the centrifugal forces which will cause the wings to be further erected. So erected, the angle of incidence of the wings is set at the desired angle with conventional helicopter rotor mechanism for actuating the pitch bearing to vary and preselect the angle of incidence, and the wings autorotate due to falling of the device, or are rotationally driven by the tip propulsion units, thereby exerting lift on the object attached to the device. This positive, effective method of erecting the wings into operating position is to be contrasted with other known methods, such as providing a spring internally of the wings which mechanically expands and thereby erects the blades and maintains them in operating condition.

I claim:

1. In a rotary wing device, a rigid hub, bearing means for rotatably mounting the hub for rotation of the hub about an axis of rotation, a plurality of rigid wing roots each having upper and lower exterior airfoil surfaces defining the same airfoil shape in a chord plane, connecting means extending from the hub radially from the axis of rotation of the hub to each wing root for rotatably connecting each wing root to the hub with the chord plane of the wing root parallel to the axis of rotation of the hub for rotation of the wing root with the hub about the axis of rotation of the hub and also rotation of the wing root relative to the hub about an axis perpendicular to the axis of rotation of the hub and for restraining movement of the wing root away from the hub in a direction perpendicular to the axis of rotation of the hub, said wing roots being spaced from each other symmetrically about the axis of rotation of the hub, first and second flexible gas-impermeable elongated sheets spaced from each other and disposed over each wing root, said first and second sheets extending from the wing root with their elongate extents extending radially from the axis of rotation of the hub to a tip spaced from the wing root in the plane of rotation of the hub, the first sheet being disposed over one exterior airfoil surface of the wing root and the second sheet being disposed over the other exterior airfoil surface of the wing root with said first and second sheets gas-impermeably connected together along their elongate extents at the leading and trailing edges of the airfoil shape of the wing root, a band overlying the first and second sheets on each wing root and circumscribing the wing root, said band clamping the first and second sheets against the wing root to gas-impermeably connect the first and second sheets to the wing root, a concentrated mass on the tip of the first and second sheets on each wing root, means for gas-impermeably connecting the concentrated mass to the tip of the first and second sheets on each wing root, a flexible leading edge cable disposed between the first and second sheets on each wing root at the leading edge of the wing root interiorly of the wing and extending from the wing root outwardly to the concentrated mass on the tip of the first and second sheets, the first and second sheets being secured to the leading edge cable, means for fixing the leading edge cable to the wing root, means for fixing the leading edge cable to the concentrated mass, a flexible trailing edge cable disposed between the first and second sheets on each wing root and extending between the wing root and the concentrated mass on the tip of the first and second sheets, said trailing edge cable being disposed adjacent the trailing edge of the wing root and parallel to the leading edge cable, means for fixing the trailing edge cable to the wing root, means for fixing the trailing edge cable to the concentrated mass, said leading edge cable having greater mass than said trailing edge cable in such ratio that the center of mass of the wing is located at a point about one-fourth the distance from the leading edge to the trailing edge, a plurality of flexible parallel longitudinal brace wires embedded in each first sheet and each second sheet and extending between the wing root and the concentrated mass parallel to the leading edge and trailing edge cables, a plurality of flexible parallel transverse brace wires embedded in each first sheet and each second sheet and extending between the leading edge cable and trailing edge cable at right angles thereto, a plurality of flexible diagonal brace wires embedded in each first sheet and in each second sheet, said diagonal brace wires comprising oppositely inclined diagonal brace wires crossing each other and extending between the leading edge cable and the trailing edge cable at an acute angle thereto with the diagonal brace wires inclined in each direction being parallel to each other, a plurality of flexible chord brace wires extending between each first sheet and each second sheet on each wing root, said chord brace wires being disposed in planes parallel to the chord plane of the wing root and comprising substantially coplanar plural pairs of oppositely inclined crossed chord brace wires spaced from each other from the leading edge cable to the trailing edge cable with the lengths of the pairs of crossed chord brace wires defining an airfoil configuration of the first and second sheets when the chord brace wires are linearly erected in the direction of their extent between the first and second sheets, each pair of crossed chord brace wires being substantially coplanar and having their ends which are connected to the same one of the first and second sheets spaced from each other a less amount than the spacing from each other of the ends of such pair of crossed chord brace wires connected one end to the first sheet and the other end to the second sheet, said chord brace wires being connected to the first and second sheets by looping over the longitudial brace wires in the first and second sheets, and means communicating through each wing root from the exterior of the wing root to the space between the first and second sheets on the wing root to admit gas to said space between the first and second sheets from exteriorly of the wing root.

2. In a rotary wing device, a rigid hub, bearing means for rotatably mounting the hub for rotation of the hub about an axis of rotation, a plurality of rigid wing roots each having upper and lower exterior airfoil surfaces defining the same airfoil shape in a chord plane, connecting means extending from the hub radially from the axis of rotation of the hub to each wing root for rotatably connecting each wing root to the hub with the chord plane of the wing root parallel to the axis of rotation of the hub for rotation of the wing root with the hub about the axis of rotation of the hub and also rotation of the wing root relative to the hub about an axis perpendicular to the axis of rotation of the hub and for restraining movement of the wing root away from the hub in a direction perpendicular to the axis of rotation of the hub, said wing roots being spaced from each other symmetrically about the axis of rotation of the hub, first and second flexible gas-impermeable elongated sheets spaced from each other and disposed over each wing root, said first and second sheets extending from the wing root with their elongate extents extending radially from the axis of rotation of the hub to a tip spaced from the wing root in the plane of rotation of the hub, the first sheet being disposed over one exterior airfoil surface of the wing root and the second sheet being disposed over the other exterior airfoil surface of the wing root with said first and second sheets gas-impermeably connected together along their elongate extents at the leading and trailing edges of the airfoil shape of the wing root, means for gas-impermeably connecting the first and second sheets to the wing root, a concentrated mass on the tip of the first and second sheets on each wing root, means for connecting the concentrated mass to the tip of the first and second sheets on each wing root, a flexible leading edge cable disposed between the first and second sheets on each wing root adjacent to the leading edge of the wing root and extending from the wing root outwardly to the concentrated mass on the tip of the first and second sheets, the leading edge cable comprising means for defining an aerodynamic contour of the wing at the leading edge of the wing, means for fixing the leading edge cable to the wing root, means for fixing the leading edge cable to the concentrated mass, a flexible trailing edge cable disposed between the first and second sheets on each wing root and extending between the wing root and the concentrated mass on the tip of the first and second sheets, said trailing edge cable being disposed adjacent the trailing edge of the wing root and parallel to the leading edge cable, means for fixing the trailing edge cable to the wing root, the mass of the leading edge cable being greater than the mass of the trailing edge cable sufficient to locate the center of mass of the wing forwardly of the chord midlength and substantially along the axis about which the wing root is rotatable relative to the hub, means for fixing the trailing edge cable to the concentrated mass, a plurality of flexible parallel longitudinal brace wires embedded in each first sheet and each second sheet and extending between the wing root and the concentrated mass parallel to the leading edge and trailing edge cables, a plurality of flexible diagonal brace wires embedded in each first sheet and in each second sheet, said diagonal brace wires comprising oppositely inclined diagonal brace wires crossing each other and extending between the leading edge cable and the trailing edge cable at an acute angle thereto with the diagonal brace wires inclined in each direction being parallel to each other, a plurality of flexible chord brace wires extending between each first sheet and each second sheet on each wing root, said chord brace wires being disposed in planes parallel to the chord plane of the wing root and comprising substantially coplanar plural pairs of oppositely inclined crossed chord brace wires spaced from each other from the leading edge cable to the trailing edge cable with the lengths of the pairs of crossed chord brace wires defining an airfoil configuration of the first and second sheets when the chord brace wires are linearly erected in the direction of their extent between the first and second sheets, each pair of crossed chord brace wires being substantially coplanar, and means communicating through each wing root from the exterior of the wing root to the space between the first and second sheets on the wing root to admit gas to said space between the first and second sheets from exteriorly of the wing root.

3. In a rotary wing device, a rigid hub, bearing means for rotatably mounting the hub for rotation of the hub about an axis of rotation, a plurality of rigid wing roots each having upper and lower exterior airfoil surfaces defining the same airfoil shape in a chord plane, connecting means extending from the hub radially from the axis of rotation of the hub to each wing root for rotatably connecting each wing root to the hub with the chord plane of the wing root parallel to the axis of rotation of the hub for rotation of the wing root with the hub about the axis of rotation of the hub and also rotation of the wing root relative to the hub about an axis perpendicular to the axis of rotation of the hub and for restraining movement of the wing root away from the hub in a direction perpendicular to the axis of rotation of the hub, said wing roots being spaced from each other symmetrically about the axis of rotation of the hub, first and second flexible gas-impermeable elongated sheets spaced from each other and disposed over each wing root, said first and second sheets extending from the wing root with their elongate extent extending radially from the axis of rotation of the hub to a tip spaced from the wing root in the plane of rotation of the hub, the first sheet being disposed over one exterior airfoil surface of the wing root and the second sheet being disposed over the other exterior airfoil surface of the wing root with said first and second sheets gas-impermeably connected together along their elongate extents at the leading and trailing edges of the airfoil shape of the wing root, means for gas-impermeably connecting the first and second sheets to the wing root, a concentrated mass on the tip of the first and second sheets on each wing root, means for connecting the concentrated mass to the tip of the first and second sheets on each wing root, a flexible leading edge cable defining the contour of the leading edge of the wing disposed between the first and second sheets on each wing root adjacent to the leading edge of the wing root and extending from the wing root outwardly to the concentrated mass on the tip of the first and second sheets, means for fixing the leading edge cable to the wing root, means for fixing the leading edge cable to the concentrated mass, a flexible trailing edge cable disposed between the first and second sheets on each wing root and extending between the wing root and the concentrated mass on the tip of the first and second sheets, said trailing edge cable being disposed adjacent the trailing edge of the wing root and parallel to the leading edge cable, means for fixing the trailing edge cable to the wing root, means for fixing the trailing edge cable to the concentrated mass, a plurality of flexible parallel longitudinal brace wires embedded in each first sheet and each second sheet and extending between the wing root and the concentrated mass parallel to the leading edge and trailing edge cables, a plurality of flexible diagonal brace wires embedded in each first sheet and in each second sheet, said diagonal brace wires comprising oppositely inclined diagonal brace wires crossing each other and extending between the leading edge cable and the trailing edge cable at an acute angle thereto with the diagonal brace wires inclined in each direction being parallel to each other, a plurality of flexible chord brace wires extending between each first sheet and each second sheet on each wing root, said chord brace wires being disposed in planes parallel to the chord plane of the wing root and comprising substantially coplanar plural pairs of oppositely inclined crossed chord brace wires spaced from each other from the leading edge cable to the trailing edge cable with the lengths of the pairs of crossed chord brace wires defining an airfoil configuration of the first and second sheets when the chord brace wires are linearly erected in the direction of their extent between the first and second sheets, each pair of crossed chord brace wires being substantially coplanar and having their ends which are connected to the same one of the first and second sheets spaced from each other a less amount than the spacing from each other of the ends of such pair of crossed chord brace wires connected one end to the first sheet and the other end to the second sheet, said chord brace wires being connected to the first and second sheets by looping over the longitudinal brace wires in the first and second sheets, and means communicating through each wing root from the exterior of the wing root to the space between the first and second sheets on the wing root to admit gas to said space between the first and second sheets from exteriorly of the wing root.

4. In a rotary wing device, a plurality of elongated wings each having a hub end and a top end at opposite ends of its elongate extent, hub means connected to the hub end of each wing for rotatably mounting the wings for rotation of the wings and the hub means about an axis of rotation substantially normal to the elongate extent of the wings with the wings extending radially outwardly from such axis of rotation and spaced from each other about such axis of rotation, flexible gas-impermeable first and second sheets spaced from each other and defining the exterior surfaces of each wing and also defining a gas-impermeable space within the wing between the first and second sheets extending the length and width of the wing, a plurality of flexible chord brace members disposed within each wing and extending between the first and second sheets of the wing, means for connecting the chord brace members to the first sheet and to the second sheet, the extent of the chord brace members between the first and second sheets lying in a plane transverse and normal to the elongate extent of the wing and the chord brace members being spaced from each other in a direction extending between the elongate edges of the wing, the chord brace members being comprised of plural pairs of substantially coplanar oppositely inclined crossed chord brace members with the ends of each such pair of chord brace members which are connected to the same sheet of the wing being spaced from each other a less amount than the ends of the same pair of chord brace members connected one to the first sheet and the other to the second sheet so that expanding gas pressure in the gas-impermeable space within the wing results in tensioning both the chord brace members and the portion of each of the first and second sheets extending between the ends of each pair of crossed chord brace members attached to that sheet, the extent of the pairs of crossed chord brace members between the first and second sheets of each wing varying as they are spaced from the elongate edges of the wing to define an airfoil configuration of the first and second sheets in a plane normal to the elongate extent of the wing responsive to linear erection of the chord brace members, and means for supplying gas to the gas-impermeable space within each wing.

5. In a rotary wing device according to claim 3, the mass of the leading edge cable being greater than the mass of the trailing edge cable in such ratio that the center of mass of the wing is forwardly of the midlength of the chord of the wing and is disposed substantially along the axis of rotation of the wing root relative to the hub.

References Cited in the file of this patent
UNITED STATES PATENTS

| | | |
|---|---|---|
| Re. 22,595 | Upson | Jan. 23, 1945 |
| 2,090,038 | Goddard | Aug. 17, 1937 |
| 2,172,333 | Theodorsen et al. | Sept. 5, 1939 |
| 2,226,978 | Pescara | Dec. 31, 1940 |
| 2,502,101 | Morgan et al. | Mar. 28, 1950 |
| 2,614,636 | Prewitt | Oct. 21, 1952 |
| 2,616,509 | Thomas | Nov. 4, 1952 |
| 2,657,716 | Ford | Nov. 3, 1953 |
| 2,657,884 | Merrill | Nov. 3, 1953 |
| 2,717,043 | Isacco | Sept. 6, 1955 |
| 2,886,265 | Ritter et al. | May 12, 1959 |
| 2,967,573 | Johnson | Jan. 10, 1961 |
| 2,996,121 | Stub | Aug. 15, 1961 |

FOREIGN PATENTS

| | | |
|---|---|---|
| 28,704 | Great Britain | Dec. 20, 1911 |
| 800,738 | France | May 11, 1936 |
| 660,793 | Germany | June 2, 1938 |

OTHER REFERENCES

Germany, Ser. No. G. 16,816, Mar. 29, 1956.

UNITED STATES PATENT OFFICE

CERTIFICATE OF CORRECTION

Patent No. 3,101,121
August 20, 1963

Richard H. MacNeal

It is hereby certified that error appears in the above numbered patent requiring correction and that the said Letters Patent should read as corrected below.

Column 1, line 53, for "penumatic" read -- pneumatic --; column 2, lines 19 and 20, strike out "FIG. 3 is an enlarged sectional view taken along the line 2-2 of FIG.1;" and insert instead -- FIG. 3 is an enlarged sectional view of the region 3-3 in FIG. 2; --; line 22, for "inventoin" read -- invention --; column 4, line 60, for "seets" read -- sheets --; line 64, strike out "the", second occurrence; column 6, line 44, after "may" insert -- be --; column 10, line 30, for "extent" read -- extents --; column 11, line 19, for "top" read -- tip --.

Signed and sealed this 31st day of March 1964.

(SEAL)
Attest:

ERNEST W. SWIDER

Attesting Officer

EDWARD J. BRENNER

Commissioner of Patents